United States Patent [19]

Ebata et al.

[11] Patent Number: 4,854,667

[45] Date of Patent: Aug. 8, 1989

[54] OPTICAL FIBER ALIGNMENT AND FIXING METHOD AND APPARATUS THEREFOR

[75] Inventors: Genji Ebata, Akigawa; Koji Tanabe, Tanashi; Takahiro Saito, Tokyo, all of Japan

[73] Assignee: Japan Aviation Electronics Industry Limited, Tokyo, Japan

[21] Appl. No.: 261,867

[22] Filed: Oct. 25, 1988

[30] Foreign Application Priority Data

Oct. 30, 1987 [JP] Japan .................................. 62-276923

[51] Int. Cl.[4] .......................... G02B 6/36; G02B 7/26; G02B 6/38
[52] U.S. Cl. ................................ 350/96.20; 350/96.21
[58] Field of Search ........................... 350/96.20, 96.21

[56] References Cited

U.S. PATENT DOCUMENTS

| 4,673,245 | 6/1987 | Kling et al. | 350/96.2 |
|---|---|---|---|
| 4,678,271 | 7/1987 | Beauliew | 350/96.2 |
| 4,702,556 | 10/1987 | Ishii et al. | 350/96.2 |
| 4,714,315 | 12/1987 | Krause | 350/96.2 |
| 4,746,195 | 5/1988 | Auracher et al. | 350/96.2 |
| 4,763,979 | 8/1988 | Heywang | 350/96.2 |
| 4,767,174 | 8/1988 | Carenco et al. | 350/96.2 |
| 4,779,946 | 10/1988 | Pimpinella et al. | 350/96.2 |

Primary Examiner—William L. Sikes
Assistant Examiner—Georgia Y. Epps
Attorney, Agent, or Firm—Pollock, Vande Sande and Priddy

[57] ABSTRACT

A first translation stage which holds an optical fiber and a second translation stage which holds a laser diode package are provided, and these translation stages are movable in the X-, Y- and Z-axis directions. A third translation stage movable in the X-, Y- and Z-axis directions is provided, on which are mounted a microscopic video camera and a laser head. On a video monitor a cursor is moved to the positions of the fiber tip and a laser diode in the laser diode package displayed on the monitor screen and the coordinates of the fiber tip and the laser diode are determined, on the basis of which the fiber tip and the laser diode are moved toward each other. The laser diode is excited and the fiber tip and the laser diode are positioned relative to each other so that the power of laser light received at the fiber tip becomes maximum. Then the laser light is applied from the laser head to the position where to fix the optical fiber, thereby welding or soldering it to the laser diode package.

12 Claims, 5 Drawing Sheets

FIG. 4

OPTICAL FIBER ALIGNMENT AND FIXING METHOD AND APPARATUS THEREFOR

BACKGROUND OF THE INVENTION

The present invention relates to a method and apparatus for fixing an optical fiber to a laser diode package in axial alignment with its laser diode for efficient incidence of light therefrom to the optical fiber.

A laser diode package, combined with an optical fiber fixed at one end thereof opposite a laser diode for the propagation of its light to the outside, is commonly referred to as a laser diode module. In the fabrication of the laser diode module, it is necessary to fix the positions of the laser diode and the optical fiber relative to each other after axially aligning them to maximize the efficiency of incidence of light from the laser diode to the optical fiber It is important, in this case, to fix the optical fiber to the laser diode package in axial alignment with the laser diode.

SUMMARY OF THE INVENTION

It is an object of the present invention to provide a method and apparatus which enables an optical fiber to be fixed to the laser diode in precise alignment with the laser diode.

According to the present invention, there are provided a first translation stage which supports one end portion of an optical fiber and is movable along three axes, a second translation stage which supports a laser diode package and is movable along the three axes and a third translation stage which supports a microscope for observing the optical fiber and the laser diode package, and a laser head for fixing the former to the latter by welding or soldering and which is also movable along the three axes. The first, second and third translation stages can each be shifted to a desired position by a position control signal from a control unit which corresponds to the coordinates of that position. The microscope carries a video camera head and is capable of displaying images of the laser diode package and the optical fiber on a video monitor. An optical power detector is connected to the other end of the optical fiber and the detected power signal is provided to the control unit. The laser head mounted on the third translation stage is supplied with laser light via a guide from a laser source for welding or soldering.

The position coordinates of the tip of the optical fiber and the laser diode displayed on the video monitor are determined by positioning them at a cursor on the monitor screen, and the first translation stage is shifted in accordance with the thus determined coordinates until the distance between the tip of the optical fiber and the laser diode reaches a predetermined value.

Next, the position of the second translation stage is adjusted by the control unit so that the optical fiber is axially aligned with the laser diode for efficient incidence of light from the latter to the former, and then the third translation stage is shifted to bring on the video monitor the laser beam from the laser head to the position where the optical fiber is to be fixed. After this, the optical fiber is welded or soldered to the laser diode package by irradiation with the laser energy.

DESCRIPTION OF THE PREFERRED EMBODIMENT

Figure 1:
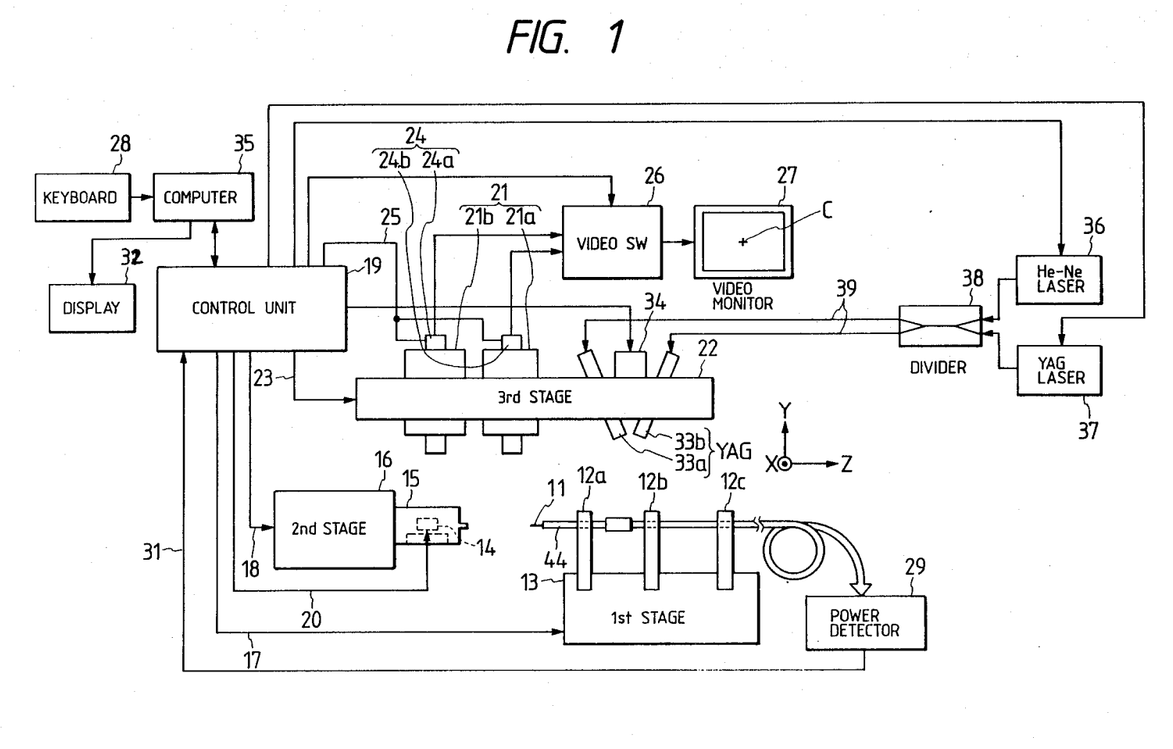
FIG. 1 is a functional block diagram illustrating an embodiment of the optical fiber alignment and fixing apparatus of the present invention.

FIG. 1 is a functional block diagram illustrating the entire structure of the optical fiber alignment and fixing apparatus of the present invention. An optical fiber 11, covered at its tip end portion with a protective pipe 44 of metal, is supported to a first translation stage 13 by means of chucks 12a, 12b and 12c. A laser diode 14 is housed in a package 15 with its lid taken off and the package 15 is held by a second translation stage 16. A control unit 19 responds to position coordinate signals from a computer 35 to control the first and second translation stages 13 and 16 via control lines 17 and 18, by which the optical fiber 11 and the laser diode 14 can be moved in the axial direction of the optical fiber 11 (hereinafter referred to as the Z axis), in a horizontal direction perpendicular to the Z axis (hereinafter referred to as the X axis) and in a direction perpendicular to the X axis (hereinafter referred to as the Y axis). In addition, the optical fiber 11 can be turned about the Z axis.

The laser diode 14 is activated by power which is supplied from the control unit 19 via a cable 20.

A microscope device 21 is provided for observing the vicinity of the tip end portion of the optical fiber 11 and the vicinity of the laser diode 14. While this example is shown to employ microscopes 21a and 21b for the optical fiber 11 and the laser diode 14, respectively, one of them may be dispensed with and the other one may be used for observation of both the optical fiber 11 and the laser diode. The microscopes 21a and 21b are mounted on a third translation stage 22 side by side in the Z-axis direction. The control unit 19 responds to a position coordinate signal from the computer 35 via a control line 23 to control the third translation stage 22, shifting the microscopes 21a and 21b in the direction of arrangement of the optical fiber 11 and the laser diode 14, that is, along the Z-axis direction and X- and Y-axis directions perpendicular thereto.

Magnified images of the objects under observation by the microscope device 21 are image-sensed by a video camera 24. In this example, video camera heads 24a and 24b, each formed by a CCD, for example, are set on the microscopes 21a and 21b, respectively. A cursor signal from the control unit 19 is provided via a line 25 to each of the video camera heads 24a and 24b and combined with its video output. The video outputs of the video camera heads 24a and 24b are provided via a video switch 26 to a video monitor 27. The switching of the video switch 26 takes place under control of the computer 35 via the control unit 19.

On the video monitor 27 the vicinity of the tip end portion of the optical fiber 11 or the vicinity of the laser diode 14 is displayed and a cross-hair cursor C is displayed on the monitor screen substantially centrally thereof. By operating a keyboard 28 while observing the image being displayed on the video monitor 27, the third translation stage 22 is moved as desired, whereby an arbitrary point of the image can be brought to the position of the cursor C lying at the center of the screen. The amount of movement of the third translation stage 22 is always calculated by the computer 35. That is, the computer 35 calculates the coordinates of the point specified by the cursor C.

The other end of the optical fiber 11 is connected to an optical power meter 29, the measured output of which is input into the computer 35 via a line 31 and the control unit 19. The control unit 19 moves the second translation stage 16 and, if necessary, the first translation stage 13 under control of the computer 35 so as to maximize the measured output of the power detector 29. The computer 35 has connected thereto a display 32 to indicate thereon instructions to an operator, the current positions of controlled parts, the current step in a sequence of automatic operations, etc. The computer 35 has prestored therein programs for such various operations as mentioned above.

On the third translation stage 22 there are fixedly mounted YAG laser heads 33a and 33b for welding or soldering the pipe 44 of the optical fiber 11 to the inside of the package 15 after completion of the positioning of the tip of the optical fiber 11 and the laser diode 14 relative to each other. It must be noted here that FIG. 1 is a mere functional block diagram, in which the two laser heads 33a and 33b are shown to lie in the same plane as that containing the axes of the microscopes 21a and 21b, for convenience of illustration. In practice, however, the laser heads 33a and 33b are disposed symmetrically with respect to the Y-Z plane containing the axes of the microscopes 21a and 21b and tilted inwardly relative to each other as will be seen from FIGS. 2 to 4. A spacing controller 34 is provided for controlling the spacing of the laser heads 33a and 33b so as to change the distance between two laser beam spots projected by the laser heads 33a and 33b. The control unit 19 drives the spacing controller 34 in accordance with a control signal from the computer 35.

A He—Ne laser 36 for positioning use and a YAG laser 37 for heating use are provided, the outputs of which are connected to an optical divider 38. The timings and periods of excitation of the lasers 36 and 37 are controlled by the computer 35 via the control unit 19. Laser light is distributed by the divider 38 to two laser guides 39 and applied therethrough to the laser heads 33a and 33b. He—Ne laser beams are emitted from the laser heads 33a and 33b and, at the same time, the third translation stage 22 is moved by operating the keyboard 28 while observing the video monitor 27 so that the laser beams are directed to the position where the optical fiber 11 is to be fixed. Upon completion of this positioning operation, the YAG laser 37 is excited for a required period of time by operating the keyboard 28 so that YAG laser beams are emitted from the laser heads 33a and 33b to heat the pipe 44 of the optical fiber 11 at the above-mentioned position, thus welding or soldering it to the package 15. Provision is made for retracting the microscopes 21a and 21b to allow ease in mounting the optical fiber 11 and the laser diode 14. The magnification of the microscopes 21a and 21b can be changed as required.

Next, a description will be given of an example of the procedure of aligning the optical fiber with the laser diode by use of the optical fiber alignment and fixing device of the present invention. In this work, instructions which are displayed on the display in accordance with a program stored in the computer 35 are executed as follows:

(a) The translation stages 13, 16 and 22 are set to their initial positions.

(b) The laser diode package 15, with its lid taken off, is mounted on the second translation stage 16.

(c) The protective pipe 44 (see FIGS. 2 and 3) of the optical fiber 11 is attached to the chucks 12a, 12b and 12c. By this, the tip of the optical fiber is always held at a predetermined initial position with tolerances less than several millimeters.

(d) The video camera 24a is selected by the video switch 26. By operating the keyboard 28 while observing the image of the tip of the optical fiber 11 displayed on the video monitor 27, the microscope 21a is focused on the fiber tip and then the fiber tip is moved to the cross cursor C on the video monitor 27. The focusing of the microscope 21a to the fiber tip is carried out by moving the third translation stage 22 in the Y-axis direction and the positioning of the fiber tip at the cross cursor C is done by moving the third translation stage 22 in the X- and Z-axis directions.

(e) Upon completion of the positioning of the fiber tip to the cursor C, the keyboard 28 is operated to calculate the coordinates $P_1$ ($X_1$, $Y_1$, $Z_1$) of the fiber tip at that time and a command is issued to the computer 35 to store the coordinates in a predetermined storage area in the computer.

(f) The video camera 24b is selected by the video switch 26, displaying the vicinity of the laser diode 14 in the laser diode package 15 on the video monitor 27. By operating the keyboard 28 while observing the image on the video monitor 27, the microscope 21b is focused on the laser diode 14 and the right-hand end of the laser diode 14 is moved to the cross cursor C on the video monitor 27. The focusing of the microscope 21b is performed by moving the third translation stage 22 in the Y-axis direction and the positioning of the right-hand end of the laser diode 14 at the cursor C is done by moving the third translation stage 22 in the X- and Z-axis directions.

(g) Upon completion of the positioning of the right-hand end of the laser diode 14 to the cursor C, the keyboard 28 is operated to calculate the coordinates $P_2$ ($X_2$, $Y_2$, $Z_2$) of the right-hand end of the laser diode 14 at that time and a command is issued to the computer 35 to store the coordinates in a predetermined storage area in the computer.

(h) A command is issued from the keyboard 28 to the computer 35 to move the optical fiber 11 and the laser diode 14 toward each other. The computer 35 responds to this command to move the first translation stage 11 toward the laser diode 14 by ($P_1$—$P_2$—Zg) mm. As a result of this, the tip end portion of the optical fiber 11 is inserted into the package 15 and the tip of the optical fiber 11 and the right-hand end of the laser diode 14 are spaced Zg apart. The value Zg is preselected greater than the focal length of the semispherical end of the optical fiber 11.

(i) The laser diode 14 is excited to emit light and the second translation stage 16 is automatically controlled by the computer 35 in three dimensions, that is, in the X-, Y- and Z-axis directions so that a maximum quantity of light enters the optical fiber 11.

Figure 2:
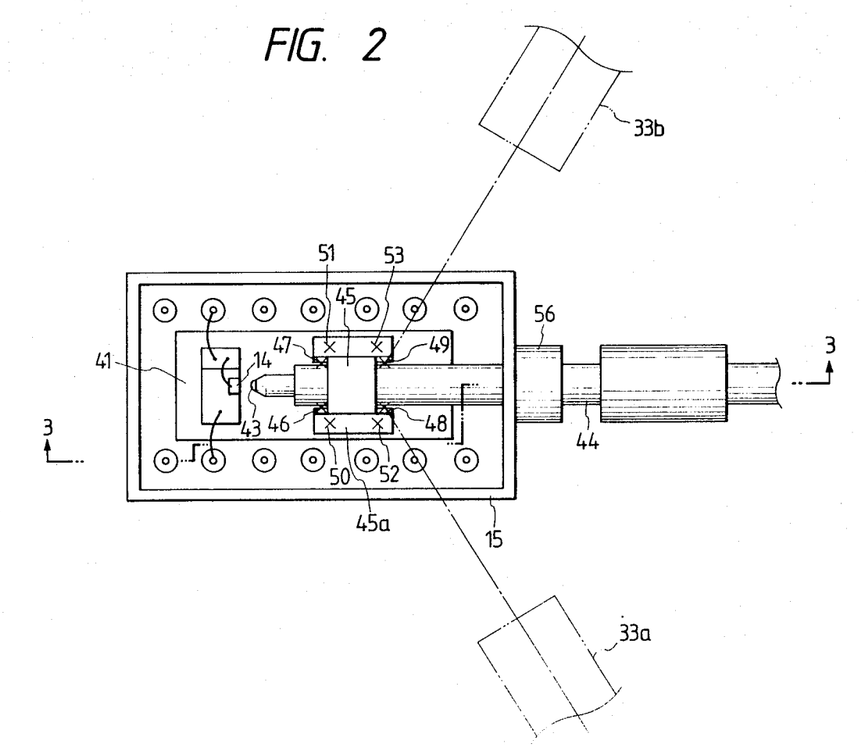
FIG. 2 is a plan view showing a laser diode package, with its lid taken off, and an optical fiber inserted therein but not yet fixed thereto.
Figure 3:
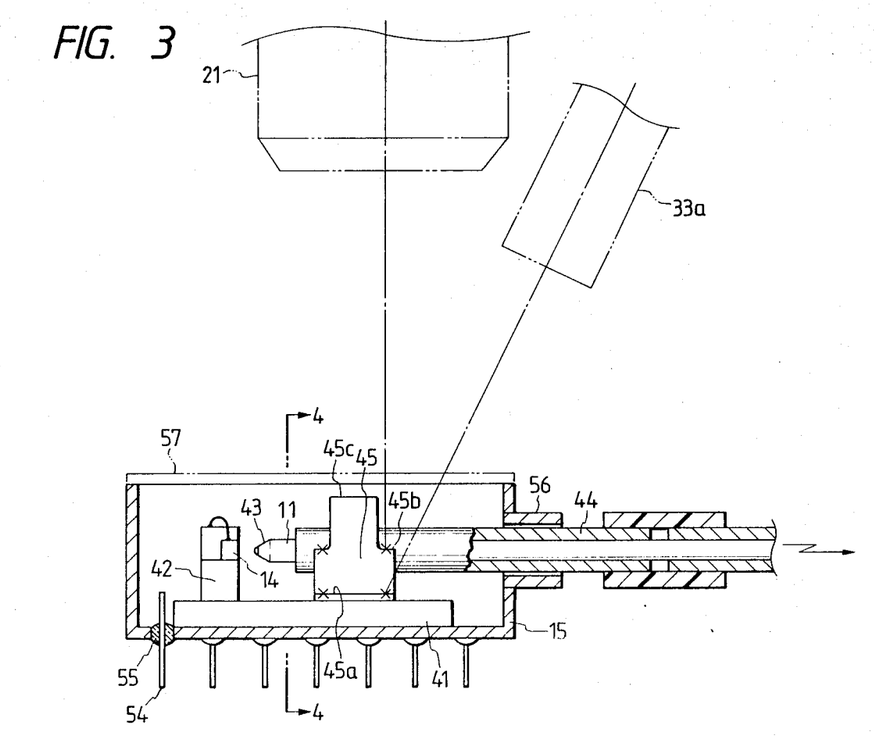
FIG. 3 is a sectional view taken on the line 3—3 in FIG. 2.
Figure 4:
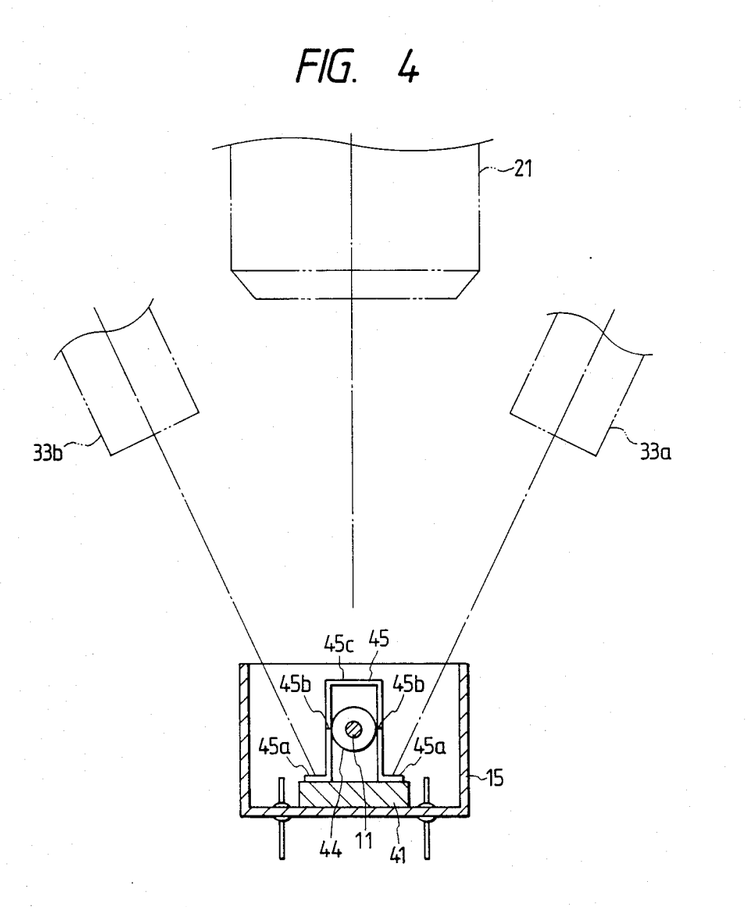
FIG. 4 is a sectional view taken on the line 4—4 in FIG. 3.

By the above sequence of steps the optical fiber 11 and the laser diode 14 are positioned relative to each other. While in the above steps (d), (e), (f) and (g) the third translation stage 22 is moved to bring the images of the fiber tip and the laser diode 14 to the position of the cursor C on the screen of the video monitor 27, it is also possible to move the cursor C to the tip of the optical fiber 11 and the laser diode 14 on the monitor screen and calculate the coordinates of the fiber tip and the laser diode 14 from the amounts of movement of the cursor C at that time. In FIGS. 2, 3 and 4 there is shown the state in which the optical fiber 11 and the laser diode 14 have been positioned relative to each other by the steps described above. In the package 15 there is disposed a metal substrate 41 and the laser diode 14 is carried by a chip carrier 42 mounted on the substrate 41. The package 15 is made of metal and its bottom panel has made therein holes 55 in two files, through which terminal pins 54 are inserted, the holes being hermetically sealed with glass. By the above-mentioned steps the optical fiber 11 is inserted into the package 15 through a sleeve 56 extending from one end face thereof and a semispherical tip 43 of the optical fiber 11 is disposed opposite the laser diode 14. Then, the optical fiber 11 is fixed in the package 15 by welding or soldering. A description will hereinbelow be given of fixing the optical fiber 11 by welding.

For fixing the optical fiber 11 in the package 15 by welding, a fixture 45 is mounted on the substrate 41 from above the protective pipe 44 of the optical fiber 11 after completion of the above-mentioned positioning work. As will be seen from FIGS. 2 to 4, the fixture 45 is in the form of a saddle, which has at its bottom outwardly extending leg portions 45a on both sides. The saddle has stepped portions 45b formed by cutting off its front and rear portions from substantially an intermediate height to the top of the saddle. The width of the saddle is selected slightly greater than the outer diameter of the protective pipe 44 of the optical fiber 11. The heights of the stepped portions 45b are about the same as the height of the center axis of the optical fiber 11 positioned in the package 15. Accordingly, the outer peripheral surface of the protective pipe 44 is adjacent the inner wall of the saddle or the fixture 45 at the stepped portions 45b of the saddle. The fixing of the optical fiber 11 starts with welding of the stepped portions 45b of the fixture 45 to the protective pipe 44 by irradiating them with a YAG laser beam at positions 46, 47, 48 and 49 indicated by crosses "X". This is followed by welding the leg portions 45a of the fixture 45 to the substrate 41 through irradiation with the YAG laser beam at positions 51, 51, 52 and 53 indicated by crosses "X".

In the present invention the above welding takes place in the following sequence:

(j) The saddle-shaped fixture 45 is mounted on the substrate 41, straddling the protective pipe 44 of the optical fiber 11 aligned with the laser diode 14.

(k) The third translation stage 22 is moved by operating the keyboard 28 to enter the welding points 46 and 47 into the visual field of the microscope 21a and display them on the video monitor 27.

(l) The He—Ne laser 36 is excited by operating the keyboard 28 to emit the He-Ne laser light through the laser heads 33a and 33b.

(m) The third translation stage 22 is adjusted in position and at the same time the head spacing controller 34 is driven by operating the keyboard 28 while observing the video monitor 27 so that the He—Ne laser spots from the laser heads 33a and 33b are directed exactly to the welding points 46 and 47, respectively.

(n) Upon completion of the positioning step (m), the coordinates of the third translation stage 22 at that time are stored in the computer 35 and, at the same time, the YAG laser 37 is excited by operating the keyboard 28. As a result of this, the YAG laser light is applied through the laser heads 33a and 33b to the welding points 46 and 47 at the same time, thereby welding together the fixture 45 and the optical fiber 11 at the stepped portions 45b of the former.

(o) The computer 35 has prestored therein data such as the spacing of the welding points 46 and 48, 46 and 47, 50 and 52, 50 and 51, and the spacing of the welding points 46 and 50 in the Z-axis direction. Accordingly, the computer 35 responds to the next command from the keyboard 28 to automatically move the third translation stage 22 by a predetermined distance in the Z-axis direction, performing welding at the points 48 and 47. Next, the computer 35 drives the head spacing controller 34 to space the laser heads 33a and 33b a predetermined distance apart and, at the same time, moves the third translation stage 22 in the Z-axis direction in accordance with the welding points 50 and 51, performing welding there. Further, the computer 35 moves the third translation stage 22 in the Z-axis direction in accordance with the welding points 52 and 53 and performs welding there. When the welding proceeds from the points 48 and 47 to the points 50 and 51, the third translation stage 22 need not be moved in the Y-axis direction, because the focal length of the laser head is about 50 mm whereas the height of the stepped portion 45b is as small as several millimeters.

By the above steps the optical fiber 11 is fixed in the package 15. Thereafter, a cover 57 is welded to the package 15 as indicated by the broken line and the protective pipe 44 is soldered to the sleeve 56, thus obtaining a hermetically sealed laser diode module.

Where either one of the laser heads 33a and 33b is provided in the device of FIG. 1, the optical fiber 11 is likely to move due to thermal strain during welding, but this can be avoided by simultaneous welding at two symmetrical positions on the right and left sides of the optical fiber 11.

Figure 5:
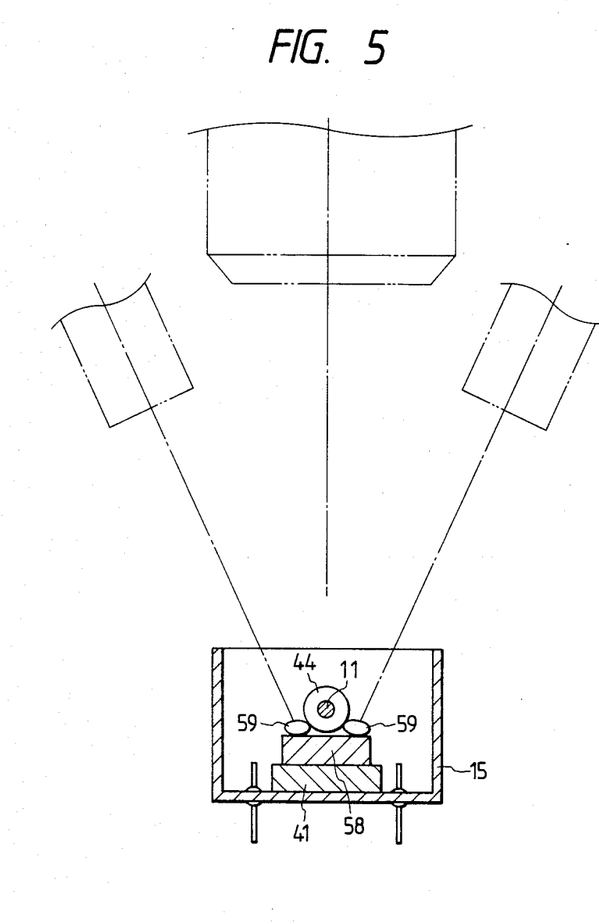
FIG. 5 is a sectional view of the laser diode package, corresponding to FIG. 4, for explaining the fixing of the optical fiber by soldering.

In the case of fixing the optical fiber 11 to the package 15 by soldering the protective pipe 44, the saddle-shaped fixture 45 is not used but instead the package 15 is used in which a block-like mount 58 is placed on the substrate 41 as shown in FIG. 5. In the afore-mentioned step (j) after aligning the optical fiber 11 with the laser diode 15, solder pellets 59 are placed on the mount 58 adjacent both sides of the protective pipe 44, instead of the fixture 45, as shown in FIG. 5. In the same manner as described above with regard to the steps (k) to (m) the laser heads 33a and 33b are focused on the solder pellets 59 and the YAG laser light is applied to the solder pellets 59 to melt them, soldering the fiber protective pipe 44 to the mount 58. Also in this instance, it is preferable to apply the YAG laser light to the solder pellets 59 symmetrically with respect to the optical fiber 11 so as to avoid misalignment of the fiber 11 owing to thermal strain.

As described above, according to the present invention, the microscopes, the video cameras and the laser heads are mounted on the same translation stage, and after aligning the optical fiber with the laser diode, the laser heads are focused on the position where to fix the optical fiber on the video monitor screen, and then the optical fiber is fixed to the laser diode package by emitting the laser energy from the laser heads. The operations can be automatically performed and, in addition, accurate positioning can be achieved. Further, it is easy to avoid misalignment of the optical fiber due to thermal strain during the fixing operation.

It will be apparent that many modifications and variations may be effected without departing from the scope of the novel concepts of the present invention.

What is claimed is:

1. An optical fiber alignment and fixing apparatus comprising:
   a first translation stage for holding one end portion of an optical fiber extending in a Z-axis direction, said first translation stage being movable in the Z-axis direction and in X- and Y-axis directions perpendicular to the Z-axis direction;
   a second translation stage for holding a laser diode package housing a laser diode, said second translation stage being movable in the X-, Y- and Z-axis directions;
   a third translation stage movable in the X-, Y- and Z-axis directions;
   microscope means mounted on said third translation stage, for observing said laser diode and said optical fiber;
   laser head means mounted on said third translation means and capable of radiating laser light into said laser diode package;
   control means for controlling the movement of said first, second and third translation stages;
   video camera head means attached to said microscope means;
   a video display device connected to said video camera head means;
   an optical power detector connected to the other end of said optical fiber; and
   laser source means connected to said laser head means, for supplying the laser light thereto.

2. The apparatus of claim 1, wherein said laser source means includes a heating laser light source and a visible laser light source and heating laser light and visible laser light emitted therefrom are selectively excited by said control means for supply to said laser head means.

3. The apparatus of claim 1 or 2, wherein said laser head means includes first and second laser heads disposed symmetrically with respect to the Y-Z plane and laser light dividing means is provided for dividing the laser light from said laser source means into two for supply to said first and second laser heads.

4. The apparatus of claim 3, which further includes means for controlling the spacing of said first and second laser heads.

5. The apparatus of claim 2, wherein said heating laser light source is a YAG laser.

6. The apparatus of claim 2, wherein said visible laser light source is a He—Ne laser.

7. The apparatus of claim 1, wherein said microscope means includes first and second microscopes arranged side by side on said third translation stage but spaced apart in the Z-axis direction, with their optical axes held in the Y-axis direction.

8. The apparatus of claim 7, wherein said video camera means includes first and second video camera heads attached to said first and second microscopes, respectively, and video signal switching means switching between said first and second cameras for selectively applying signals therefrom to said video display device.

9. A method for aligning and fixing an optical fiber by use of an optical fiber alignment and fixing apparatus which includes: a first translation stage which holds said optical fiber and movable in X-, Y- and Z-axis directions; a second translation stage which holds a laser diode package housing a laser diode and movable in the X-, Y- and Z-axis directions; a third translation stage movable in the X-, Y- and Z-axis directions; microscope means mounted on said third translation stage; video monitor means for displaying an image observed by said microscope means; and a laser head mounted on said third translation stage; said method comprising the steps of:
   bringing the image of the tip of said optical fiber displayed on said video monitor means to the position of a cursor formed thereon and determining the coordinates $P_1$ of the tip of said optical fiber;
   bringing the image of said laser diode displayed on said video monitor means to the position of said cursor formed thereon and determining the coordinates $P_2$ of said laser diode;
   moving said first translation stage on the basis of the determined coordinates $P_1$ and $P_2$ to shift the tip of said optical fiber and said laser diode toward each other until the distance therebetween reaches a predetermined value Zg;
   emitting light from said laser diode and moving said second translation stage to adjust the positions of said laser diode and the tip of said optical fiber relative to each other so that the power of the laser light received at the tip of said optical fiber becomes maximum;
   moving said third translation stage while observing images displayed on said video monitor means to focus a visible laser light beam from said laser head on the position where to fix said optical fiber in said laser diode package; and
   emitting a heating laser light beam from said laser head to fix said optical fiber.

10. The method of claim 9, wherein the steps of determining the coordinates $P_1$ and $P_2$ each include a step of moving said third translation stage to bring the tip of said optical fiber and said laser diode to the position of said cursor fixed on said monitor screen.

11. The method of claim 9, wherein the steps of determining the coordinates $P_1$ and $P_2$ each include a step of moving said cursor to the positions of the tip of said optical fiber and said laser diode and a step of determining the coordinates $P_1$ and $P_2$ on the basis of the amounts of movement of said cursor.

12. An optical fiber alignment and fixing method which employs a first translation stage for holding an optical fiber, a second translation stage for holding a laser diode package, a microscope for observing the optical fiber and the laser diode package, and beam head apparatus disposed in a fixed relation to said microscope for selectively projecting a visible light beam and a heating light beam said method comprising the steps of:
   aligning said optical fiber with a laser diode of said laser diode package by moving the relative positions of said first and second translation stages so that light from said laser diode enters said optical fiber at high efficiency;

projecting the visible light beam from said beam head apparatus;

moving said beam head apparatus while observing an image of the visible light beam through said microscope to bring the visible light beam to a position in said laser diode package where said optical fiber is to be fixed to said laser diode package; and projecting the heating light beam from said beam head apparatus to fix said optical fiber to said laser diode package.

* * * * *